United States Patent Office 2,804,836
Patented Sept. 3, 1957

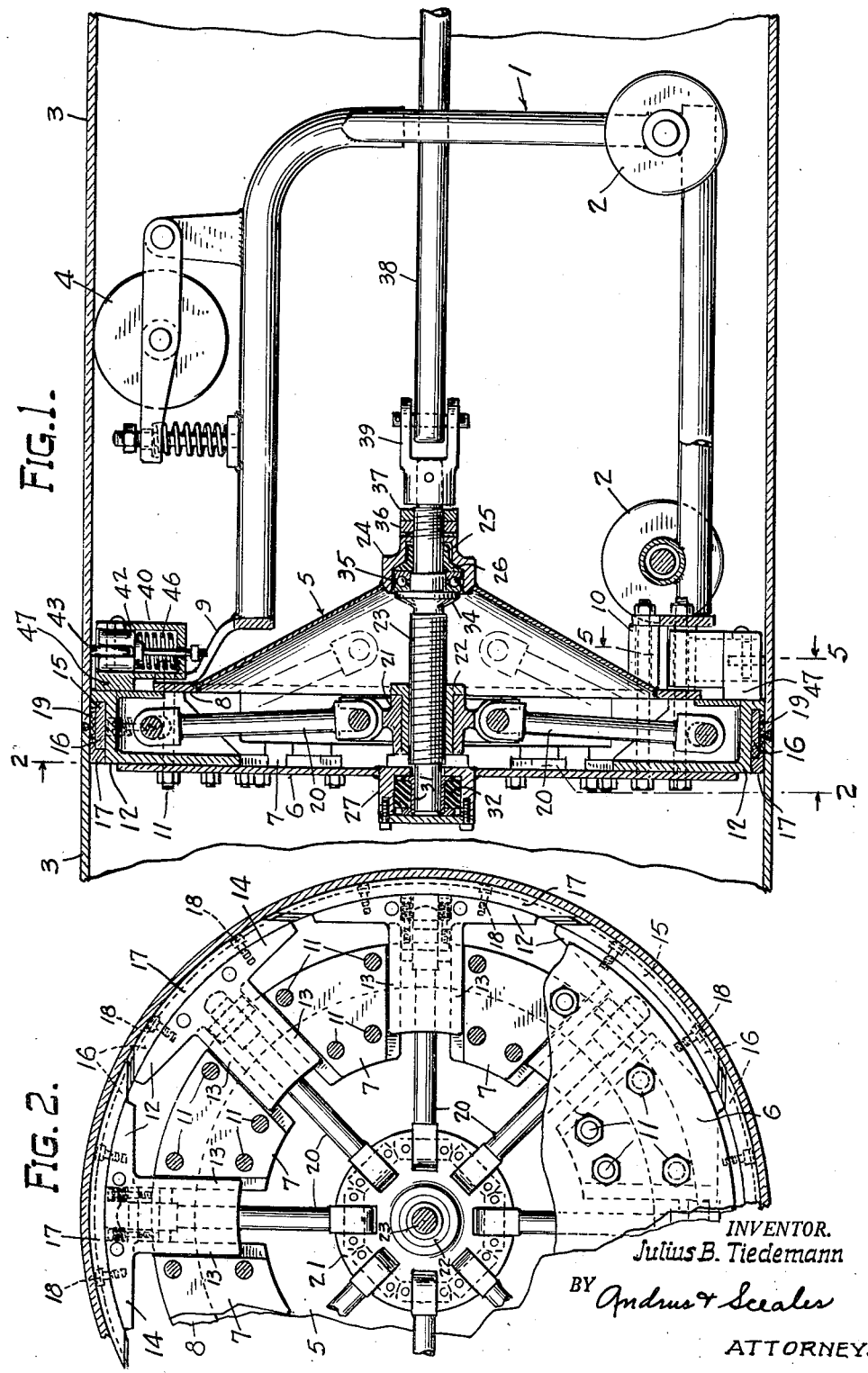

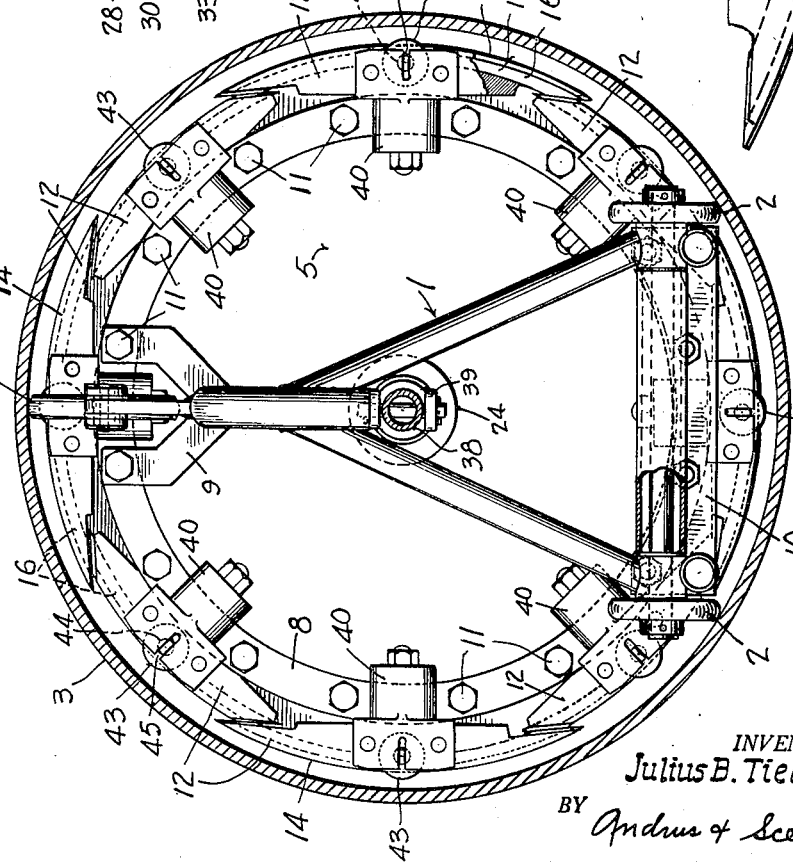

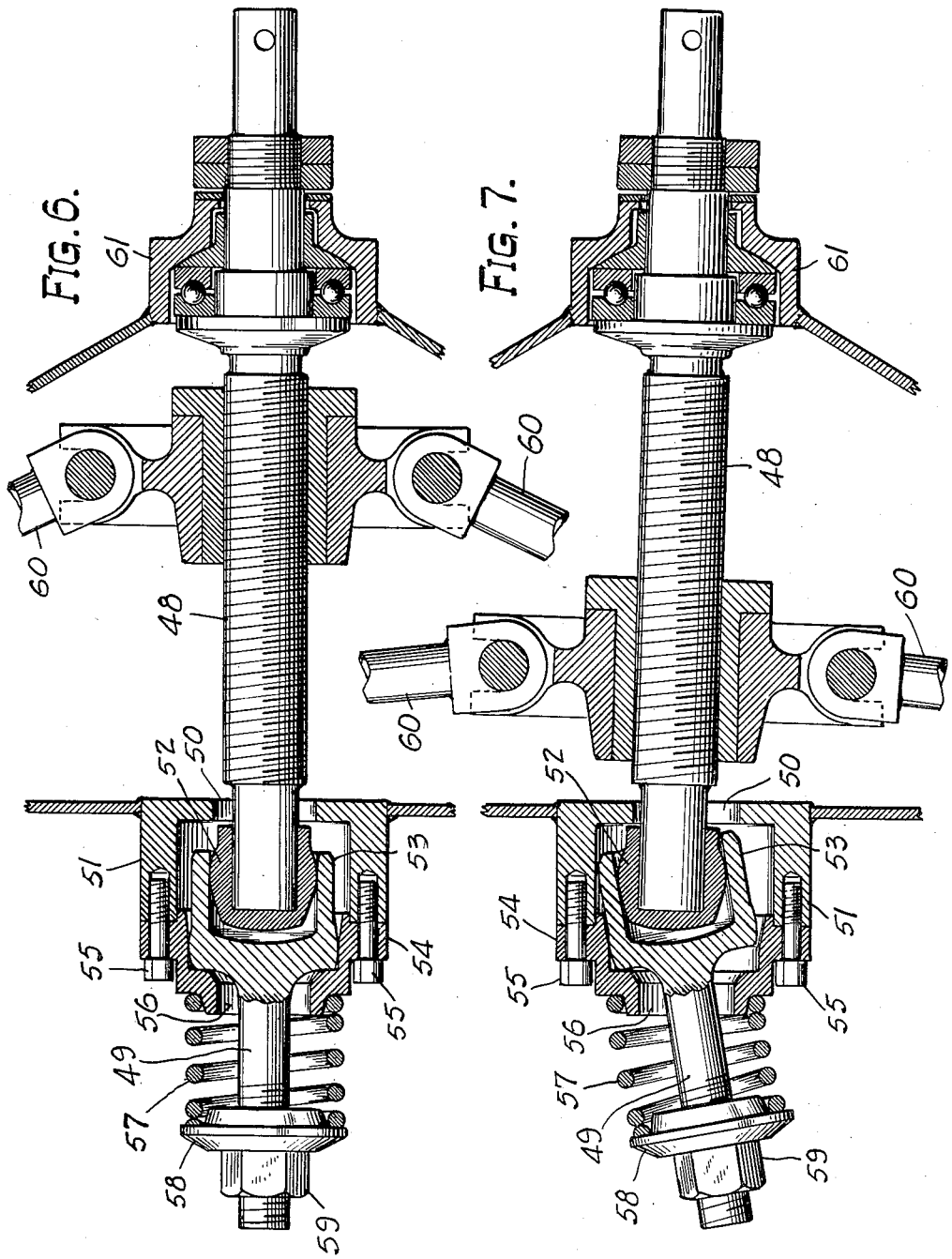

2,804,836

INTERNAL ALIGNMENT CLAMP FOR GIRTH WELDING

Julius B. Tiedemann, Milwaukee, Wis., assignor to A. O. Smith Corporation, Milwaukee, Wis., a corporation of New York Application July 11, 1952, Serial No. 298,392

9 Claims. (Cl. 113—103)

This invention relates to a welding alignment clamp and more particularly to a clamp to be employed to internally align the adjacent ends of two pipe sections to be welded together.

An object of the present invention is to provide a clamp for aligning the adjacent ends of two pipe sections in proper welding position and for supporting the molten weld metal during welding of said ends.

Another object of the invention is to provide an internal welding alignment clamp which will effectively align and restore the circular configuration of pipe sections of distorted cross section.

Still another object of the invention is to provide an expandable internal alignment clamp whereby the clamp is expanded in purely radial direction in order to achieve a maximum expanding force.

A further object is to provide an internal welding clamp having auxiliary positioning means whereby the clamp may be maintained in proper alignment within a pipe section before the main clamping apparatus is expanded into contact with said pipe sections.

In the past difficulty has frequently been encountered when attempting to align the adjacent ends of pipe sections in proper welding position when one or both of the pipe sections are oval or otherwise distorted in cross section rather than being perfectly circular. The conventional internal alignment clamp utilizing radially expanding shoes or clamping members has considerable difficulty in bending these distorted cross sectional pipes to the required circular configuration because, while the expanding shoes tend to initially bend the portion of the distorted pipe of lesser diameter and eliminate distortion, the shoes will not automatically center themselves in the pipe due to the gripping action of the shoes against the pipe and therefore the ultimate shape of the pipe section will not be circular.

The present invention is directed to an internal welding clamp which will permit the shoes, when aligning distorted pipe sections of considerable length, to be automatically centered within the sections and thereby shape the distorted pipe sections into a circular configuration. Apparatus for carrying out the invention as shown and described in this application includes a moveable frame having wheels or the like to enable the frame to be moved and positioned within the pipe sections to be welded. The frame carries a hand operated drive shaft which is interconnected with a plurality of circularly spaced toggle arms. The toggle arms are adapted to be expanded and contracted in accordance with rotation of the shaft.

Each toggle arm carries an arcuate supporting shoe which is adapted ot bear on either side of the joint between adjacent ends of the pipe sections and align the same in proper welding position. To permit the shoes to be centered in distorted pipe sections the drive shaft is allowed to float within the frame. That is, one end of the shaft is suitably pivoted in a ball socket while the other end is supported in a resilient rubber cushion. This construction permits the shaft to move or float during the expanding operation and thereby center the shoes within the pipe sections.

In a second embodiment of the invention the pivotal movement of the shaft is cushioned by inserting the forward end of the shaft within the socket-shaped end of a stud. As the shaft pivots, it tends to pivot the stud against the force of a coil spring. The action of the spring tends to cushion the pivotal movement of shaft and serves to realign the shaft in an axial relation with the frame when the shoes are collapsed out of contact with the pipe sections.

The present apparatus is also provided with preliminary positioning means which consists of a spring loaded roller associated with each shoe to initially contact the pipe sections and maintain the apparatus in position therein before the shoes are expanded outwardly into clamping engagement with the pipe sections.

Other objects and advantages of the invention will appear in the course of the following description.

In the drawings:

Figure 1 is a side elevation with parts broken away in section of the aligning clamp in the expanded position within the pipe sections;

Figure 2 is a transverse section taken along line 2—2 of Figure 1;

Figure 3 is a rear elevation view of the clamp disposed within the pipe sections and shown in the contracted position;

Figure 4 is an enlarged detailed section of the floating drive shaft;

Figure 5 is an enlarged detailed section of one of the positioning members taken along line 5—5 of Figure 1;

Figure 6 is an enlarged fragmentary section of the floating shaft of the second embodiment with the apparatus being in the collapsed position.

Figure 7 is a view similar to Figure 6 of the second embodiment showing the pivotal action of the shaft occurring when aligning pipe sections of distorted cross sectional contour.

Referring ot the drawings there is shown in the first embodiment an apparatus for use in internally aligning the adjacent ends of two pipe sections to be welded. The apparatus is adapted to be expanded into contact with the underside of the joint between the adjacent ends of the pipe sections to position the same in proper welding alignment and to back up the molten weld metal during welding.

The apparatus comprises a moveable tubular frame 1 which is provided with suitable wheels 2 or the like to facilitate movement of the frame within the pipe sections 3.

The frame is maintained in firm contact with the internal surface of the pipe sections by a spring loaded roller 4 which is rotatably secured to the upper arm of the frame and is biased outwardly into contact with pipe section 3.

The forward portion of frame 1 carries an enclosure which serves to house the expandable clamping mechanism. The enclosure includes a generally conical rear closure ring 5, a forward closure plate 6 and a plurality of connecting circularly spaced guide blocks 7.

Rear closure ring 5 is provided with an annular base flange 8 to which the upper arm of frame 1 is connected by V-bracket 9 and to which the lower legs of frame 1 are connected by brackets 10.

Closure plate 6 is disposed forwardly of and parallel to flange 8.

Guide blocks 7 which connect plate 6 and flange 8 are provided with radially extending side edges and are secured between plate 6 and flange 8 by bolts 11.

A plurality of circularly spaced supporting shoes 12 are adapted to slide radially between plate 6 and flange 8 and bear against the pipe sections 3 on either side of the joint between adjacent ends thereof to align the sections in proper welding position. The shoes 12 are maintained in alignment during the radial movement by providing the forward portion of each shoe with a pair of side flanges 13 which are guided within guideways formed in the forward radial edge portion of adjacent guide blocks 7.

The outer portion of each shoe flares circumferentially to provide a generally arcuate head 14 having an outer curvature conforming to the contour of the pipe sections to be welded.

A segmental chill ring 15 is carried by the shoes 12 and is adapted to be disposed beneath the underside of the joint between pipe sections to support the molten weld metal during welding. The arcuate segments 16 of ring 15 are each disposed within a peripheral groove formed in the outer surface of each head 14 and retained therein by keeper bar 17 and bolts 18.

The ends of each chill segment 16 are beveled as shown in Figure 3. The beveled ends of each alternate chill segment converge inwardly toward the body portion of the corresponding shoe to which they are attached. In distinction the beveled ends of each intermediate adjacent segment diverge inwardly away from the body portion of the shoe to which they are attached.

This construction permits each alternate shoe 12 to be withdrawn radially relative to the intermediate adjacent shoes with the beveled ends of one segment 16 sliding against the beveled ends of adjacent segments during the radial movement.

To properly form the underside of the weld bead at the joint and eliminate any problem of the chill ring sticking to the weld metal, a flexible inert backing strip 19 may be disposed on the outer surface of chill ring 16. Strip 19 projects a slight distance outwardly beyond the heads 14 of shoes 12.

Each shoe 12 is pivotally connected to the outer extremity of one of a plurality of toggle arms 20. Toggle arms 20 are adapted to be expanded and contracted to move the shoes 12 radially toward and away from the pipe sections 3.

When the toggle arms 20 are in the expanded position the beveled ends of each chill segment 16 are in lapping contacting relation with the beveled ends of adjacent segments to provide a continuous chill ring 15. As the toggle arms 20 are contracted, each alternate shoe 12 is positively drawn inwardly while the intermediate shoes are yieldably drawn inwardly due to the yielding connection between the intermediate shoes and the corresponding toggle arms similar to that described in the copending application of Althos M. Croswell, Serial No. 298,391 filed July 11, 1952, now Patent No. 2,780,194 issued February 5, 1957, and entitled Internal Back-up Clamp for Girth Welding.

As the alternate segments 16 are drawn inwardly before the intermediate segments, the beveled ends of the alternate segments slide against the beveled ends of intermediate segments and effect a contraction of the chill ring 15 to a lesser diameter.

The inner ends of the toggle arms 20 are pivotally attached to a central hub 21 which is suitably secured to an insert nut 22. Nut 22 is threadedly engaged on the central portion of a shaft 23 and rotation of the shaft causes nut 22 to move forwardly or rearwardly thereon depending on the direction of rotation of shaft 23 to expand or contract toggle arms 20.

Shaft 23 is mounted for pivotal movement within a rear bearing housing 24 secured within the apex opening of rear closure ring 5. The rear portion of shaft 23 is journaled within a bearing 25 having an outwardly extending flange 26 with a rear surface of generally spherical contour. The spherical surface of bearing flange 26 is adapted to rotate within the spherically contoured bottom surface of the axial recess in housing 24 as a ball and socket joint. This construction permits the shaft 23, and shoes 12 which are interconnected to shaft 23, to pivot relatively to the frame 1 and attached housing 24.

Forward closure plate 6 is provided with an axial opening which receives a forward bearing housing 27 within which the forward end of drive shaft 23 is rotatably secured.

Housing 27 is generally cup-shaped in configuration having a central recess 28 and an axial opening 29 in the base thereof which communicates with said recess. The base portion of housing 27 is welded within the opening in plate 6 and the open portion of recess 28 faces forwardly away from the frame 1. The open end of housing 27 is enclosed by plate 30 which is secured to the housing by suitable bolts.

The forward end of shaft 23 extends through the opening 29 and is journaled within a bearing 31 disposed within recess 28.

To permit the shaft 23 to float within forward housing 27 as the shaft pivots at rear housing 24, axial opening 29 is provided with a substantially greater diameter than shaft 23 and an annular resilient cushion 32 formed of rubber or the like is disposed in the space between shaft 23 and the wall of housing 27 and retained therein by ring 33. This construction permits the shaft 23 and bearing 31 to move or float within housing 27 against the resiliency of cushion 32 as the shaft 23 pivots within housing 24.

To prevent rearward movement of shaft 23 as the toggle arms 20 are expanded, the shaft is provided with an annular flange 34 which is adapted to bear against a thrust bearing 35. Bearing 35 is disposed within the axial recess of housing 24.

The bearing pressure of flange 34 against thrust bearing 35 may be regulated by means of an adjustment of spacing nut 36 and lock nut 37 which are threadedly engaged on shaft 23. Adjustment of nuts 36 and 37 controls the longitudinal "play" or movement of the shaft.

Shaft 23 is rotated by means of an operating rod 38 which is connected to the rear end of shaft 23 by clevis 39. Rod 38 extends beyond the end of the pipe section within which it is disposed in position to be manipulated by the operator.

The floating shaft permits the present apparatus to effectively align pipe sections which are distorted in cross sectional shape. For example, when the apparatus is inserted within a pipe section which is oval, elliptical or otherwise irregular in contour, the center of the apparatus, namely the shaft 23, is not aligned with the axis of the pipe due to the irregular contour of the same. As the shaft 23 is misaligned with the axis of the pipe some of the shoes 12 will contact the pipe before other shoes when the toggle arms 20 are expanded. With the present floating shaft the unequal force of the various shoes against the pipe will cause the shaft 23 to move until the force of all the shoes against the pipe is substantially equalized. When this occurs the portion of shaft 23 in the same transverse plane as shoes 12 will be aligned with the axis of the pipe sections and the adjacent pipe ends may be bent to a circular shape and accurately aligned by the shoes.

The present apparatus is maintained in proper welding alignment within one of said pipe sections while the second pipe section is brought into an end-to-end relation with the first by a preliminary positioning member carried by each shoe 12.

Each positioning member comprises a generally cylindrical housing 40 which is closed at its inner end by a wall 41. A plunger 42 is adapted to slidably move within housing 40 and the inner reduced end of the plunger extends through an opening in wall 41 and is threadedly engaged by a suitable nut to limit the outward movement of the plunger. The outer end of each plunger 42 is bifurcated and a roller 43 is rotatably secured between the prongs of the plunger by a pin 44. Rollers 43 are disposed transversely to this axis of the pipe sections 3 and are adapted to be brought into contacting relation with said sections to prevent longitudinal movement of the apparatus therewithin prior to the actual clamping engagement by shoes 12.

Rollers 43 are maintained in the proper transverse relation to the axis of the pipe sections by the slidable engagement of one end of pin 44 within a slotted keyway 45 in the inner surface of housing 40. Pin 44 is free to slide longitudinally within keyway 45 but rotational movement of the pin 44 and plunger 42 is prevented.

Plunger 42 is normally urged outwardly by a spring 46 which encircles the inner reduced portion of plunger 42 and bears between the bifurcated head of the plunger and wall 41. Thus roller 43 normally projects outwardly of housing 40 due to the force of spring 46.

Each housing 40 is connected to the rearward surface of the respective shoe 12 by a pad 47. When the apparatus is in the contracted position the rollers 43 are biased outwardly beyond the outer surface of the respective shoes 12.

The apparatus, in the collapsed position, is inserted within one of the pipe sections 3 to be welded and properly aligned behind the edge of the pipe. The toggle arms 20 are partially expanded by operation of rod 38 until the projecting rollers 43 are in contact with the pipe section. At this time the shoes 12 are not in contact with the pipe sections but the apparatus will be prevented from moving and maintained in alignment by the pressure of rollers 43 against the pipe section.

The second pipe section is then brought into proper end-to-end relation with the first section so that backing strip 19 is aligned behind the joint between the adjacent ends of the pipe sections. It is during this period that the positioning members function most effectively. Once the second pipe has been brought into an end-to-end relation with the first it is virtually impossible to properly align the clamping apparatus beneath the joint between adjacent pipe ends because of the extreme length of the pipe sections. Therefore it is best to align the apparatus beneath the edge of the first section and hold the apparatus in this aligned position by means of the positioning members until the second pipe section is brought to the first and the shoes are expanded to clamp both sections in proper welding alignment.

The toggle arms 20 are then further expanded causing shoes 12 to move toward the pipe sections and forcing plunger 42 inwardly against the force of spring 46. It is at this time, as the shoes 12 move outwardly but are still out of contact with the pipe sections that the positioning members serve a second function. If the pipe sections have an irregular cross sectional contour, the rollers 43, bearing against the pipe sections under the force of springs 46, will ride on the inner surface of the pipe sections and tend to center the apparatus within the sections. However, once the shoes 12 come into contact with the pipe sections the rollers will not ride on the surface of the pipe sections due to the biting or gripping force of the shoes against the sections and the centering action of the rollers 43 is ended.

The positioning members are able to satisfactorily center the apparatus within pipe sections having small irregularities in contour, but when the pipe sections have substantial deformations the action of floating shaft 23 is necessary in order to have each shoe 12 bear against the pipe sections with equal force and thereby accurately align the sections.

A modification of the present invention is shown in Figs. 6 and 7.

In this embodiment the pivotal movement of shaft 48, corresponding to shaft 23 in the first embodiment, is cushioned by adapting the forward end of shaft 48 to pivot a stud 49 against the force of a spring as the shaft itself pivots. The forward end of shaft 48 extends through axial opening 50 in cup-like housing 51, corresponding to housing 27, and is encircled by a knob-like bearing 52. Bearing 52 is disposed within the socket-shaped end 53 of stud 49.

The forward end of housing 51 is closed off by a cover 54 which is secured to housing 51 by bolts 55, and the stud 49 extends forwardly from housing 51 through an axial opening 56 formed in cover 54.

The outer shoulder of the socket-shaped end 53 of stud 49 is maintained in bearing engagement with cover 54 by a spring 57 which encircles the central portion of stud 49 and is interposed between the outer surface of cover 54 and a spring retainer 58. Spring retainer 58 is disposed on the stud 49 and retained thereon by the threaded nut 59 which engages the threaded forward end of stud 49. Adjustment of nut 59 on the stud 49 controls the compression of spring 57 and determines the force required by shaft 48 to pivot stud 49.

As seen in Fig. 6, the toggle arms 60 are in the inward collapsed position and shaft 48 is maintained in axial alignment with the housing 51 by the force of spring 57. As the toggle arms 60 expand and the shoes contact the pipe sections the shaft 48 tends to pivot within housing 61 in order to equalize the bearing force of the shoes against the pipe sections.

As shaft 48 pivots the outer end of the shaft moves radially relative to housing 51 and pivots stud 49 against the force of spring 57. This is seen in Fig. 7. The action of spring 57 effectively cushions the pivotal movement of shaft 48 and also serves to return the shaft to the axially aligned position thereof with respect to housing 51 when the toggle arms 60 are contracted.

Various embodiments of the invention may be employed within the scope of the following claims.

I claim:

1. An internal aligning clamp for use in aligning the adjacent ends of two pipe sections disposed in end-to-end relation which comprises, a movable frame adapted to be disposed within said sections, a rotatable drive shaft pivotally carried by said frame, a plurality of reciprocable members inter-connected with said shaft and adapted to be moved outwardly and inwardly with respect to the shaft in accordance with rotation of the shaft, an arcuate shoe secured to the outer end of each reciprocable member and adapted to be moved radially outwardly into contact with the sections on either side of the joint therebetween to align the same in proper welding position, roller means disposed transversely to said drive shaft and resiliently mounted to said shoes and adapted to bear against one of said pipe sections, said roller means serving to initially secure the frame against longitudinal movement within the pipe sections when the shoes are out of contact with said sections and tending to axially align the frame within said sections as the shoes move into contact with said sections, said shaft pivoting with respect to the frame when said shoes come into engagement with said pipe sections to enable the shoes to bear against the pipe sections with substantially uniform pressure and align said sections in proper welding position.

2. An internal aligning clamp for use in aligning the adjacent ends of two tubular sections disposed in end-to-end relation and being substantially distorted in cross-sectional shape which comprises, a movable frame adapted to be disposed within said sections, a rotatable drive shaft pivotally carried by said frame, a plurality of reciprocable members inter-connected with said shaft and adapted to be moved outwardly and inwardly with respect to the shaft in accordance with rotation of the shaft, an arcuate shoe secured to the outer end of each reciprocable member and adapted to be moved outwardly into contact with the sections on either side of the joint therebetween to align the same in proper welding position, resilient means secured to said shoes and adapted to bear against the interior wall of one of said pipe sections for securing the frame against longitudinal movement within said sections when the shoes are out of contact with said sections and for tending to axially align the frame within said sections as the shoes move into contact with said sections, a pair of journalling members mounted within said frame with said drive shaft rotatably secured between said journalling members, means associated with one of said journalling members effecting pivoting of the shaft as said shoes come into engagement with said pipe sections to enable the shoes to bear against said sections with uniform pressure, and means associated with said other journalling member for cushioning the pivotal movement of said shaft.

3. An internal aligning clamp for use in aligning the adjacent ends of two tubular sections disposed in end-to-end relation which comprises, a movable frame adapted to be disposed within said sections, a drive shaft carried by said frame, means to drive said shaft a plurality of reciprocable members inter-connected with said shaft and adapted to be moved outwardly and inwardly upon the driving of said shaft, an arcuate shoe secured to the outer end of each reciprocable member and adapted to be moved radially outwardly upon reciprocation of said member into contact with the sections on either side of the joint therebetween to align the same in proper welding position, and pivotable bearing means supporting said shaft within said frame to effect pivoting of said shaft in relation to said frame as said shoes come into engagement with said sections to enable the portion of the shaft in the same transverse plane as said shoes to be centered within the sections and permit each of said shoes to bear against said sections with substantially equal force.

4. An internal aligning clamp for use in aligning the adjacent ends of two tubular members disposed in end-to-end relation which comprises, a movable frame adapted to be disposed within said sections, a drive shaft carried by said frame, means to rotate said shaft a plurality of reciprocable members inter-connected with said shaft and adapted to be moved radially outwardly and inwardly with respect to the shaft upon rotation of the shaft, an arcuate shoe secured to the outer end of each reciprocable member and adapted to be moved outwardly upon reciprocation of said members into contact with the sections on either side of the joint therebetween to align the same in proper welding position, pivotable bearing means supporting the shaft within said frame and fulcruming one end of said shaft as the shoes come into engagement with said sections to permit said shaft to pivot in relation to said frame and enable the shoes to bear against the pipe sections with substantially uniform pressure, and bearing means supported within said frame and cushioning the other end of said shaft as the same pivots.

5. An internal aligning clamp for use in aligning the adjacent ends of two tubular sections disposed in end-to-end relation which comprises, a movable frame adapted to be disposed within said sections, a drive shaft carried by said frame, means to drive said shaft a plurality of reciprocable members inter-connected with said shaft and adapted to be moved outwardly and inwardly upon the driving of said shaft, an arcuate shoe secured to the outer end of each reciprocable member and adapted to be moved radially outwardly upon reciprocation of said member into contact with the sections on either side of the joint therebetween to align the same in proper welding position, a pair of journalling members connected to said frame, said drive shaft being rotatably secured within said journalling members, means associated with one of said journaling members effecting pivoting of said shaft when said shoes contact said sections to enable each of said shoes to bear against the pipe sections with substantially uniform pressure and bend said sections to a generally circular cross sectional shape, a housing to enclose the other of said journalling members and spaced outwardly therefrom with a clearance therebetween, and a resilient ring disposed within said clearance for cushioning the pivotal movement of said shaft.

6. An internal aligning clamp for use in aligning the adjacent ends of two tubular members disposed in end-to-end relation which comprises, a plurality of arcuate circumferentially spaced supporting members adapted to be disposed within said tubular members and to be moved radially outwardly into contact with said tubular members on either side of the joint therebetween to align the same in proper welding position, an arm secured to each supporting member and extending inwardly therefrom, means actuating each arm to move the supporting members radially, roller means secured to said supporting members and adapted to bear against one of said tubular members for securing said clamp against longitudinal movement within said tubular members when said supporting members are out of contact with said tubular members, and means associated with the roller means permitting retraction of the roller means inwardly as said supporting members move into contact with said tubular members.

7. An internal aligning clamp for use in aligning the adjacent ends of two tubular sections disposed in end-to-end relation which comprises, a movable frame adapted to be disposed within said sections, a rotatable drive shaft carried by said frame, a plurality of reciprocable members inter-connected with said shaft and adapted to be moved outwardly and inwardly in accordance with rotation of the shaft, an arcuate shoe secured to the outer end of each reciprocable member and adapted to be moved outwardly into contact with the sections on either side of the joint therebetween to align the same in proper welding position, a generally hollow casing secured to the side surface of each shoe, a plunger mounted for sliding movement within each casing and spring-biased outwardly therefrom, and a roller rotatably secured to the outer end of each plunger, said rollers disposed transversely to said shaft and adapted to bear against said sections and secure said frame against longitudinal movement within said sections when the shoes are out of contact with said sections and adapted to retract inwardly as the shoes move into contact with said pipe sections.

8. An internal aligning clamp for use in aligning the adjacent ends of two tubular sections disposed in end-to-end relation which comprises, a movable frame adapted to be disposed within said sections, a rotatable drive shaft carried by said frame, means to rotate said shaft a plurality of reciprocable members inter-connected with said shaft and adapted to be moved outwardly and inwardly upon rotation of the shaft, an arcuate supporting shoe secured to the outer end of each reciprocable member and adapted to be moved outwardly upon reciprocation of each member into contact with the pipe sections on either side of the joint therebetween to align the same in proper welding position, pivotable bearing means associated with the frame for fulcruming one end of the shaft as said shoes come into engagement with said sections to permit said shaft to pivot and enable said shoes to bear against said sections with substantially equal force, a pivotable member having a generally socket-shaped end to receive the other end of said shaft, and spring means associated with said pivotable member for urging said member into axial alignment with said frame, said shaft being adapted to pivot said pivotable member against the force of said spring means as the shaft pivots with said spring means serving to cushion the pivotal movement of said shaft and serving to axially align the shaft with said frame when the shoes are moved out of engagement with said sections.

9. An internal aligning clamp for application across the inside of a joint formed between adjacent ends of two pipe sections disposed in end-to-end relation for aligning the sections preparatory for welding which comprises, a movable frame adapted to be disposed within the pipe sections and having a longitudinal axis substantially coincidental with that of the pipe sections, a shaft pivotally carried on the longitudinal axis of the frame, a plurality of arcuate shoe members spaced circumferentially about the shaft and adapted to be moved radially in a common plane into and out of contact with the joint between the pipe sections, means interconnecting each shoe member and the shaft for actuating the shoe members radially, and retractable positioning means provided on said shoe members and adapted to bear against the pipe sections to initially secure the frame against longitudinal movement within the sections and retract as the shoe members move into engagement with the sections, said shaft pivoting with respect to the frame as the shoe members contact the pipe sections to enable the shoe members to bear against the sections with substantially uniform pressure and align said sections in proper welding position.

References Cited in the file of this patent

UNITED STATES PATENTS

| | | |
|---|---|---|
| 2,353,868 | Bisbee et al. | July 18, 1944 |
| 2,413,103 | Forbes | Dec. 24, 1946 |
| 2,429,053 | Forbes | Oct. 14, 1947 |
| 2,452,867 | Price et al. | Nov. 2, 1948 |
| 2,587,940 | Webster | Mar. 4, 1952 |
| 2,594,000 | Elliott | Apr. 22, 1952 |
| 2,615,413 | Adams et al. | Oct. 28, 1952 |
| 2,615,414 | Adams et al. | Oct. 28, 1952 |
| 2,638,069 | Mearns | May 12, 1953 |